US006209333B1

(12) United States Patent
Bascobert (10) Patent No.: US 6,209,333 B1
(45) Date of Patent: Apr. 3, 2001

(54) MOBILE AIR CONDITIONING SYSTEM AND CONTROL MECHANISM

(76) Inventor: Rene F. Bascobert, 159 Woodmere Dr., Tonawanda, NY (US) 14140

( * ) Notice: Subject to any disclaimer, the term of this patent is extended or adjusted under 35 U.S.C. 154(b) by 0 days.

(21) Appl. No.: 08/789,003

(22) Filed: Jan. 27, 1997

Related U.S. Application Data

(63) Continuation-in-part of application No. 08/589,867, filed on Jan. 22, 1996, now abandoned.

(51) Int. Cl.$^7$ .............................. F25B 43/00; F25B 41/04
(52) U.S. Cl. ................................... 62/217; 62/224; 62/503
(58) Field of Search .............................. 62/217, 503, 224

(56) References Cited

U.S. PATENT DOCUMENTS

| 693,170 | 2/1902 | Smith ............................... 137/505.34 |
| 1,766,648 | 6/1930 | Keller ................................. 137/513.5 |
| 2,463,892 | 3/1949 | Martin .................................... 62/224 |
| 2,916,894 | * 12/1959 | McGrath ............................ 62/217 X |
| 2,967,403 | 1/1961 | Lange et al. ........................... 62/196 |
| 3,119,559 | * 1/1964 | Heidorn ............................. 62/217 X |
| 3,122,318 | 2/1964 | Null ................................ 137/505.31 |
| 3,260,064 | 7/1966 | Newton ................................. 62/209 |
| 3,688,517 | * 9/1972 | Newton ............................. 62/217 X |
| 3,708,998 | 1/1973 | Scherer et al. ......................... 62/210 |
| 3,738,119 | 6/1973 | Scherer et al. ......................... 62/217 |
| 4,102,150 | 7/1978 | Kountz .................................. 62/209 |
| 4,890,458 | 1/1990 | Kobayashi et al. .................... 62/204 |
| 5,074,123 | 12/1991 | Iida et al. ............................ 62/228.5 |
| 5,419,157 | * 5/1995 | Kiblawi et al. ......................... 62/503 |
| 5,660,058 | * 8/1997 | Harris et al. ........................ 62/503 X |

FOREIGN PATENT DOCUMENTS 0276490  3/1988  (EP) .

* cited by examiner

Primary Examiner—William Wayner (57) ABSTRACT

The performance of mobile air conditioning systems is improved with the use of a pressure sensing valve to control refrigerant flow in the system. The pressure sensing valve is connected between the condenser and the evaporator. The control valve senses the refrigerant pressure adjacent the evaporator, i.e. the input, or output, or the combination of both, to control the refrigerant flow through the evaporator in a manner to improve the performance of the system. The reference pressure for the valve can be the atmosphere or a fixed or variable source. Various other operating variables can be sensed to control the variable source in a manner to interact with the sensed pressure to provide added control of system performance.

23 Claims, 10 Drawing Sheets

MOBILE AIR CONDITIONING SYSTEM AND CONTROL MECHANISM

This application is a CIP of Ser. No. 08/589,867 filed Jan. 22, 1996 abandoned.

FIELD OF THE INVENTION

This invention pertains in general to air conditioning systems, and more particularly to mobile air conditioning systems and control mechanisms therefor.

BACKGROUND OF THE INVENTION

The problems involved in the design of effective air conditioning systems for mobile units are significantly greater than those involved in stationary systems. In general, the basic theory of operation of the stationary and mobile air conditioning units is the same. Each system requires a cyclic refrigerant flow through an evaporator to absorb heat from the space to be cooled and through a condenser to exhaust the absorbed heat. However in a stationary system, the compressor is usually driven at a constant speed, or in more efficient systems, at two or more selectable fixed speeds. The more efficient stationary systems may also have a selectable multi-speed blower for the evaporator. In any event in stationary systems the blower and compressor speeds are known controllable quantities. The uncontrollable variables in the stationary systems are primarily the ambient temperature of the air or coolant through the condenser and the temperature of the air flow through the evaporator.

In contrast, the mobile air conditioning systems (i.e. systems located on mobile vehicles such as in autos, trucks, buses, etc.) face the same temperature variables involved with the condenser and evaporator and concerning the air flow variables through the evaporator, but in addition include a variable speed compressor whose speed is a function of the engine speed, and an air flow through the condenser that is a function or the vehicle speed. All of these additional variables are controlled by instantaneous vehicle travel requirements, thereby greatly expanding the environmental and physical constraints placed on the effective operation on the vehicle air conditioning system. These added variables involved in mobile air conditioning systems involve two extreme situations, i.e., 1) idle when the vehicle is not moving and the engine is running at slow speed (low compressor speed and low condenser air flow), and 2) road run when both the engine and the vehicle are running at high speed (high compressor speed and high condenser air flow). The problem facing mobile air conditioning system designers are to develop systems that will perform satisfactory at both these extremes and in between.

An additional problem facing such designers particularly in the automobile industry is the lack of space and cost control. As automobile designs become more compact and greater demands are placed on fuel efficiency and pollution control, there are constant design pressures to reduce the size of elements in the air conditioning systems. In addition, as usual there is the on going need to contain or reduce cost. Competing with the constraints of space and cost, there is the continued need for improvements in quality of performance. Durability of design is also a very important factor so as to minimize failures, particularly those that are catastrophic in nature that result in the destruction of expensive elements such a compressor.

Presently, in mobile air conditioning systems of the type used in automobiles, the refrigerant flow to the evaporator is controlled either by a fixed orifice or a expansion valve. The object of is to attempt to achieve maximum performance by controlling the amount of refrigerant in liquid form as it exits the evaporator (i.e., a point at which most of the refrigerant tends to change from liquid to vapor). If total vaporization of the refrigerant takes place within the evaporator, a hot spot or section is created in the evaporator thereby reducing its effectiveness. Similarly, the excessive flow of liquid refrigerant from the evaporator also reduces the system performance.

A fixed orifice is an inexpensive means to control refrigerant flow to the evaporator, but suffers the defect that the size of the orifice must be selected as a compromise solution of performance between idle and road run. If the size of the orifice is selected to favor idle, then the system will perform favorably in city driving, but will suffer reduced performance in open road driving. In contrast, if the orifice size is selected to favor road run, then city driving suffers performance.

Some automobiles use a temperature sensing expansion valve to control the refrigerant flow through the evaporator as a primary function of the refrigerant temperature at the output of the evaporator. The temperature sensing mechanism in an expansion valve is inherently slow and therefor not responsive enough to the continually varying air conditioning demands of an automobile. Furthermore, temperature is a poor indication of the condition or state or the refrigerant as it leaves the evaporator in that it can only sense vapor flow and not liquid flow, providing only one half the equation. An additional problem with the use of the expansion valve is that it tends to fail in the closed condition, resulting in the shut off of refrigerant and lubricant flow to a level that causes destruction of the compressor.

It is an object of this invention to provide a new and improved air conditioning system for mobile air conditioning systems, and control mechanisms therefor, involving the control of refrigerant flow through the air conditioning system evaporator as a function of refrigerant pressure adjacent the evaporator.

BRIEF DESCRIPTION OF THE INVENTION

In a mobile air conditioning system, control means are provided for variably controlling the amount of refrigerant flow through the air conditioning system as a function of the refrigerant pressure adjacent to the evaporator. The refrigerant pressure sensing point, or points, for the control means can be adjacent the input or output of the evaporator, or a combination of both. Other variables, such as, ambient temperature, humidity, engine speed and evaporator temperature are adapted to be sensed and combined with the sensed pressure to provide finer degree of control.

DETAILED DESCRIPTION

Figure 1:
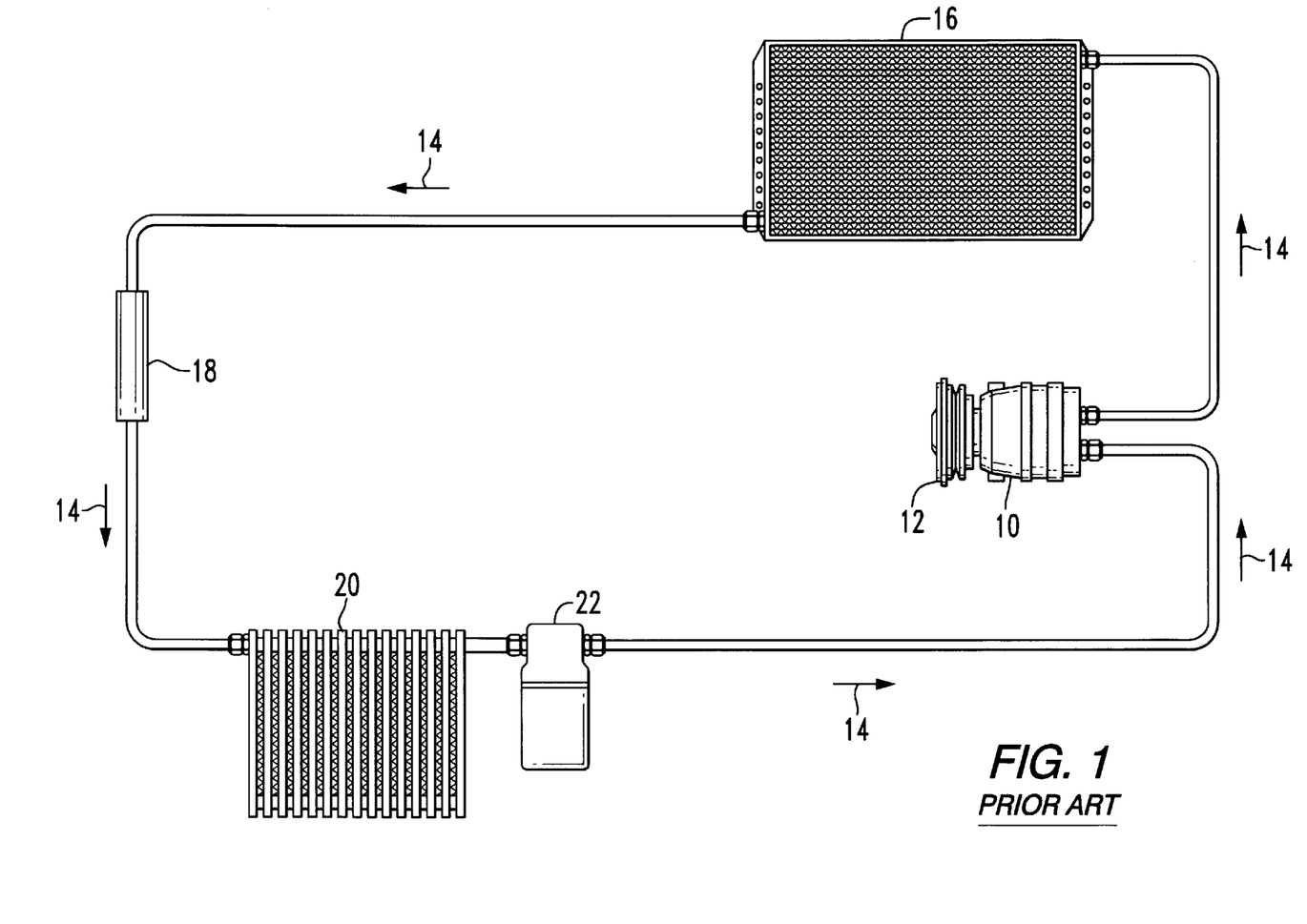
FIG. 1 is a system schematic diagram of a mobile air conditioning system of the prior art including a fixed orifice refrigerant control system.

The prior art mobile air conditioning system of FIG. 1 includes a compressor 10 that is coupled to be driven by an engine that propels the mobile unit (not illustrated). In the case of an automobile the compressor is driven by the engine via a belt coupled to the compressor 10 clutch-pulley 12. The speed at which the compressor 10 is rotated is a function of the speed of rotation of the engine. Hence the higher the speed of the rotation of the engine rotation, the higher speed of rotation of the compressor 10 and the correspondingly higher capacity of the compressor 10 to pump refrigerant, and thereby accompanied by a higher output refrigerant pressure capability.

The direction of the flow of the refrigerant through the system is illustrated by the arrows 14. A compressed high pressure gaseous refrigerant flows from the compressor 10 through a condenser 16. The purpose of the condenser 16 is to reject heat from the air conditioning system, while at the same time condenses the high pressure gaseous refrigerant into high pressure liquid refrigerant at the condenser 16 output. High pressure within the condenser is needed to cause liquidification of the refrigerant. In air conditioning systems for mobile units, air flow through the condenser 16 absorbs heat from the refrigerant flow. The flow of air through the condenser 16 is variable i.e. the faster the mobile unit is traveling, or the faster the engine fan is rotating, or the combination of both, the greater the air flow and therefor the greater the capacity for heat rejection from the condenser 16, and visa versa. At times an added blower is provided with the condenser 16 to enhance air flow at slow mobile unit travel speed.

The high pressure liquid refrigerant flows from the condenser 16 through an orifice tube 18 to an evaporator 20. The orifice tube 18 includes a fixed size of opening to allow the high pressure build up by the compressor, and restricts the amount of refrigerant flow though out the air conditioning system and in particular the amount of refrigerant flow through the evaporator 20. The refrigerant flow as it passes through the orifice, flashes across the orifice to form a foam type liquid refrigerant output that flows into the evaporator. Ideally a low temperature, low pressure all liquid refrigerant flow should enter the evaporator 20 and the refrigerant at the evaporator 20 output should be all vapor at its saturation temperature (boiling point). It is this boiling of the refrigerant within the evaporator 20 that changes the liquid refrigerant to vapor that causes the heat absorption and provides the cooling effect of the evaporator 20. The closer the evaporator 20 approaches the ideal condition, the greater its cooling effectiveness. Should the refrigerant boil off entirely somewhere within the evaporator 20, the vaporized refrigerant flow within the evaporator 20 will cause hot spots within the evaporator 20 and result in an associated loss of effectiveness. Correspondingly a flow of liquid refrigerant from the evaporator 20 also causes a loss in system performance.

The refrigerant output from the evaporator 20 flows through an accumulator 22 to the compressor 10. If liquid refrigerant flows from the evaporator 20, the accumulator 22 will accumulate the liquid. If no liquid refrigerant is received then the accumulator 22 bleeds out stored liquid into the system. In effect the accumulator 22 controls the amount of active refrigerant charge in the system. Further, it is the combination of the orifice 18 and the accumulator 22 that controls the refrigerant flow through the system. An orifice system is designed to operate so that a little liquid refrigerant flows from the evaporator 20 into the accumulator 22. If too much liquid refrigerant flows from the evaporator 20, the accumulator 22 acts as a liquid/vapor separator and stars to fill up with liquid refrigerant and thereby takes refrigerant charge from the active system. If no liquid refrigerant flows from the evaporator 20, the accumulator 22 will bleed out liquid refrigerant into the active system, thereby keeping the system properly charged. The accumulator 22 can also include a dehydrator to remove any water that may have been trapped in the system.

As previously mentioned, the size of the fixed orifice 18 is selected as a compromise solution between system operation for idle or road run. If set for idle, the system performance will favor city driving, but will suffer reduced performance in open road driving. In contrast, if set to favor road run, then city driving will suffer in performance. If set in between, system performance capability will not be achieved at idle or road run.

For purposes of simplifying the explanation of the invention, FIGS. 1–7 will have the same reference numerals for the same elements. In the prior art system of FIG. 2 the orifice of FIG. 1 has been replaced by a temperature sensing expansion valve 24. The expansion valve 24 includes a charged bulb that senses evaporator 20 output temperature by increasing the pressure within the bulb as a direct function of temperature i.e. as temperature goes up the pressure within the bulb goes up and via versa. The pressure within the bulb urges against a diaphragm that has evaporator 20 output refrigerant pressure as a reference on the other side of the diaphragm. The diaphragm operates the valve mechanism and controls the refrigerant flow therethrough. When an expansion valve is used in a mobile air conditioning system the expansion valve is set so that no liquid refrigerant flows from the evaporator 20. This is done by setting the expansion valve to control refrigerant flow so that the temperature of the refrigerant as it exits the evaporator 20 is always beyond the boiling point of the refrigerant. Therefor, since no liquid refrigerant flows from the evaporator 20, there is no need of an accumulator, and instead the system of FIG. 2 includes a receiver 26 at the output of the condenser 16. The receiver 26 functions to separate out vapor bubbles to provide a solid liquid column to the expansion valve 24. The receiver 26 may also include a dehydrator.

Figure 2:
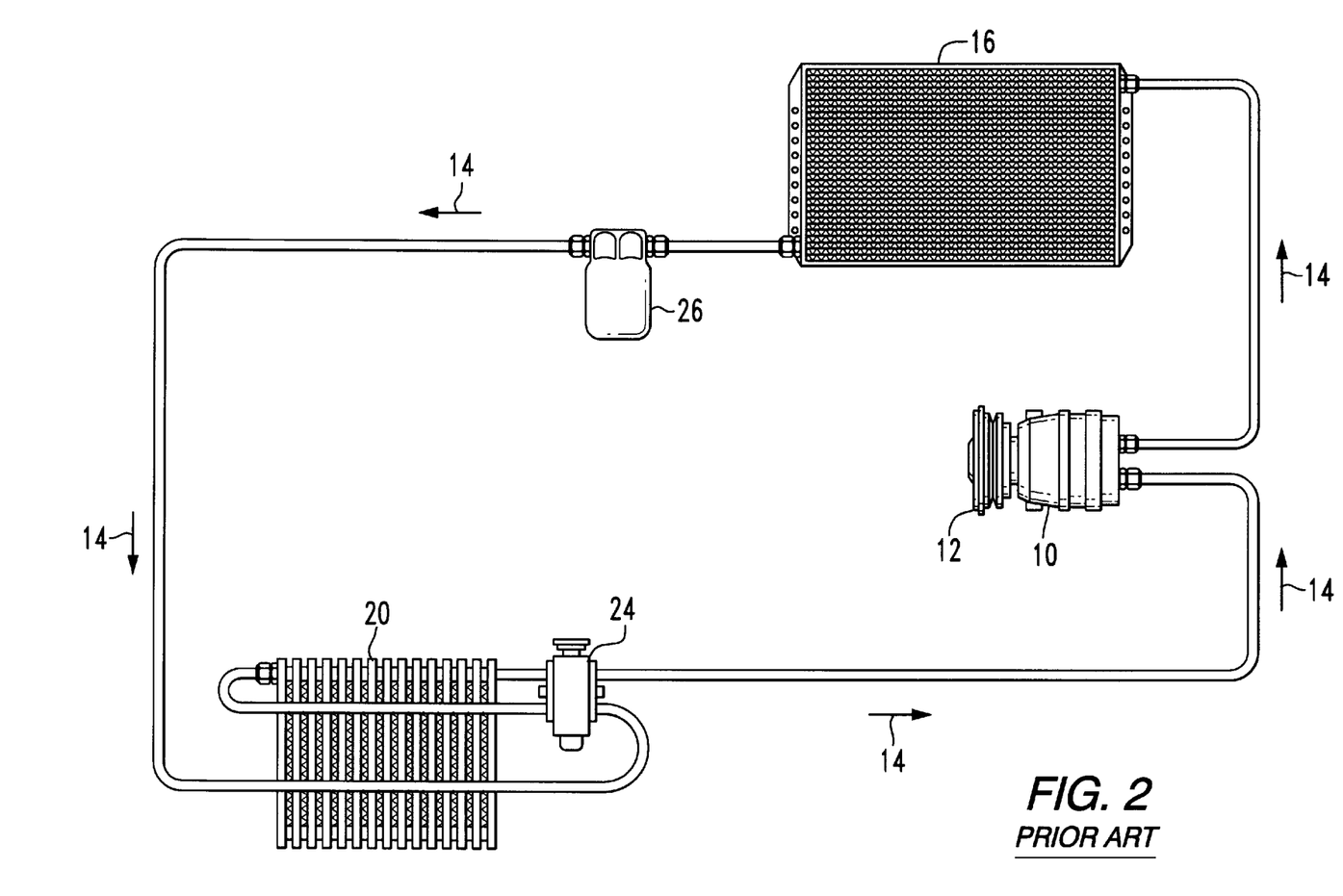
FIG. 2 is a system schematic diagram of a mobile air conditioning system of the prior art including an expansion valve refrigerant control system.

Although the temperature sensitive valve 24 may in certain circumstances provide for better operation through its variable control of refrigerant flow though the evaporator 20, the fact that the valve 24 is based on temperature sensing creates limitations on its effectiveness. For example, the temperature sensing unit is inherently slow responding, thereby limiting the capability of the valve to promptly respond to system needs. In addition, because the expansion valve is temperature sensing, it can not sense whether or not any liquid refrigerant is present. To prevent excessive liquid refrigerant flow from the evaporator 20, the flow through the evaporator needs to be controlled in a manner that the refrigerant as it exits the evaporator 20 must be above its boiling (all vapor). To accomplish this the expansion valve temperate sensor is set to control the refrigerant flow through the evaporator 20 so that the temperature of the refrigerant as it exits the evaporator is several degrees above boiling (all vapor). To maintain this exit temperature, the refrigerant must reach its boiling point within the evaporator. As a result, with vapor within the evaporator 20, a corresponding portion of the evaporator will lose its cooling capability (hot spots). A modification to the expansion valve was attempted by the use of an electronic liquid refrigerant detector which would heat valve temperature sensor, but was found to be slow in responding. Hence the expansion valve is only a partial, and more expensive, solution to the problems of the orifice type mobile air conditioning system. Therefor since the orifice provides a low cost compromise solution, the orifice tends to more extensively used despite its limitations.

Figure 3:
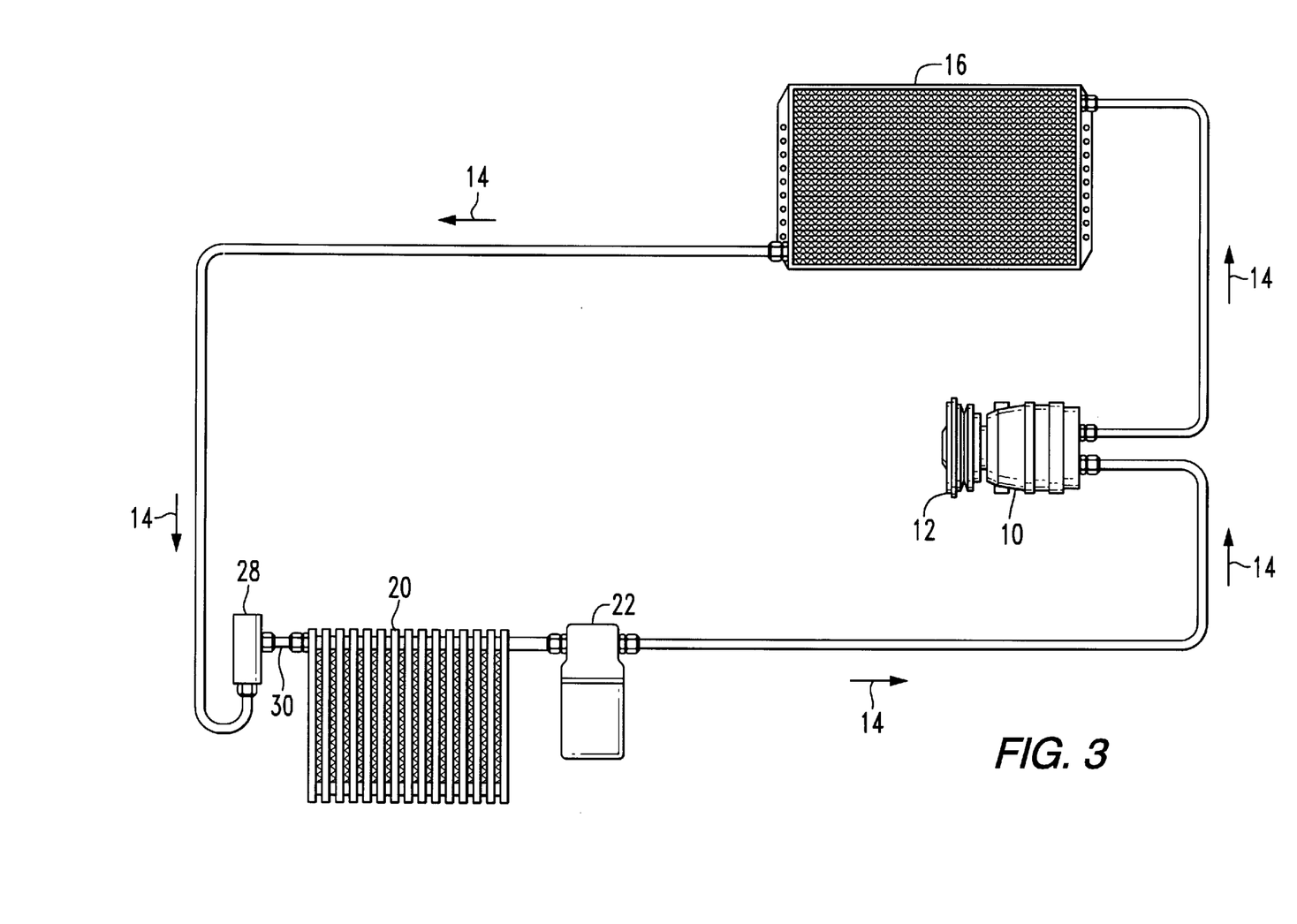
FIG. 3 is a system schematic diagram of a mobile air conditioning system including a first embodiment of a refrigerant control system of the invention wherein a pressure sensitive control valve is connected to sense evaporator input pressure to control refrigerant flow therethrough.

In FIG. 3 the first embodiment of the mobile air conditioning system of the invention includes a pressure sensitive control valve 28 instead of the fixed orifice 18. The valve 28 has a variable opening that controls the flow of refrigerant flow therethrough as a function of the refrigerant pressure at the input 30 of the evaporator 20.

Figure 4:
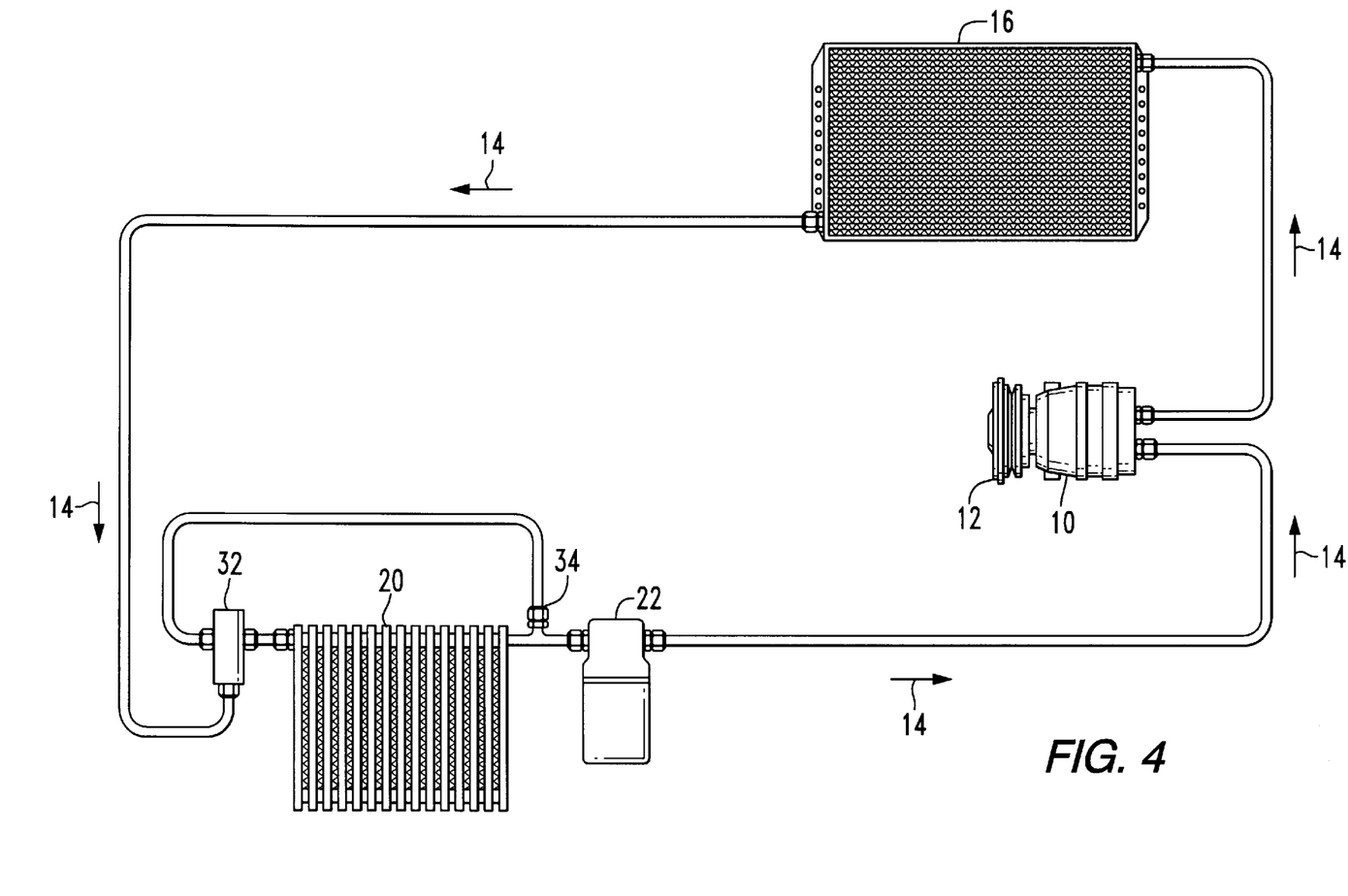
FIG. 4 is a system schematic diagram of a mobile air conditioning system including a second embodiment of a refrigerant control system of the invention wherein a pressure sensitive control valve is connected to sense evaporator output pressure to control the flow of refrigerant therethrough.

In FIG. 4 the second embodiment of the mobile air conditioning system of the invention includes a pressure sensitive control valve 32. The valve 32 has a variable opening that controls the flow of refrigerant flow therethrough as a function of the refrigerant pressure at the output 34 of the evaporator 20.

Figure 5:
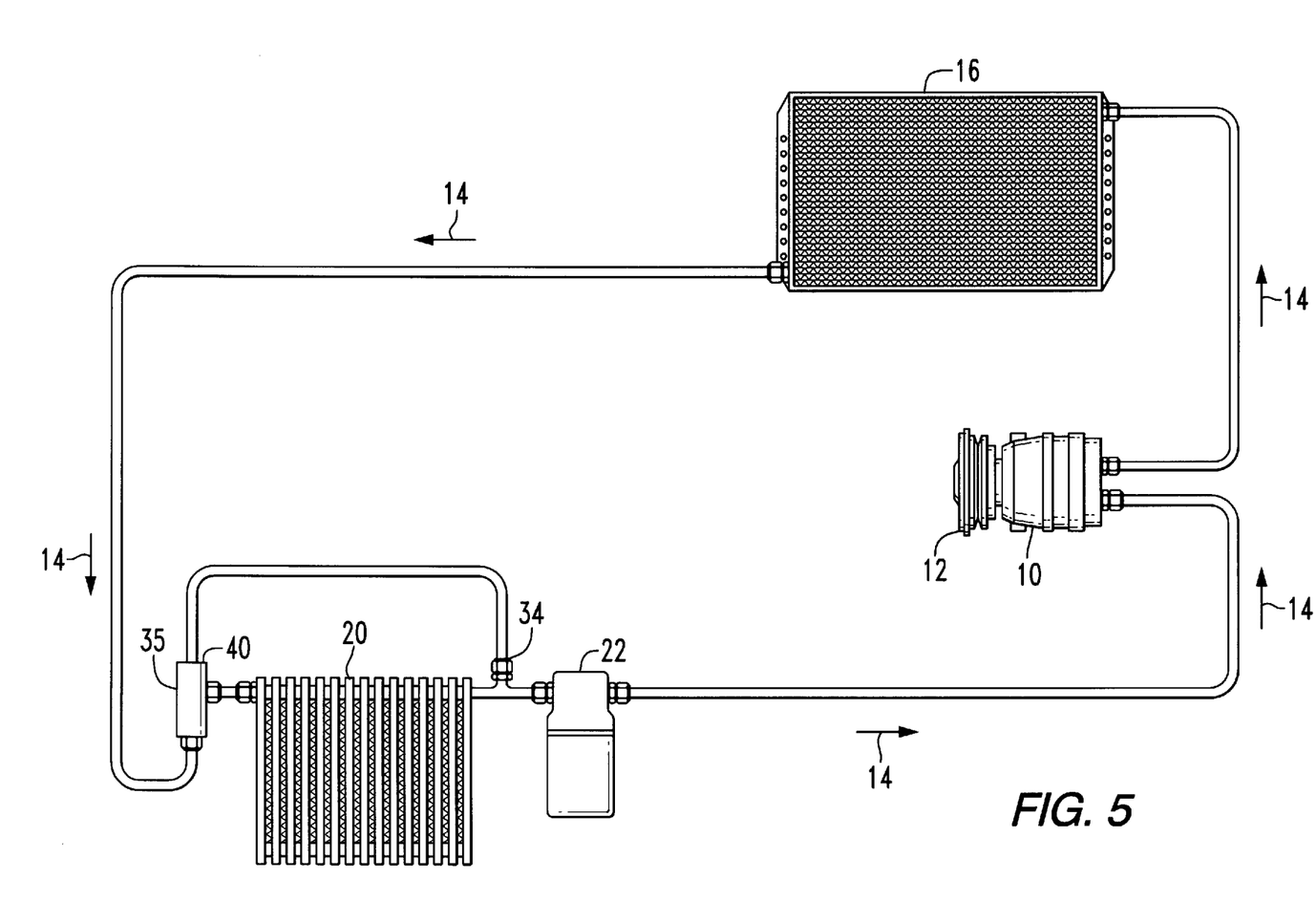
FIG. 5 is a system diagram of a mobile airconditioning system including a third embodiment of a refrigerant control system of the invention wherein a pressure sensitive control valve is connected to sense both evaporator input and output pressure to control the flow of refrigerant therethrough.

In FIG. 5 the third embodiment of the mobile air conditioning system of the invention includes a pressure sensitive control valve 35 that is connected to sense both the evaporator input and output pressure.

Figure 6:
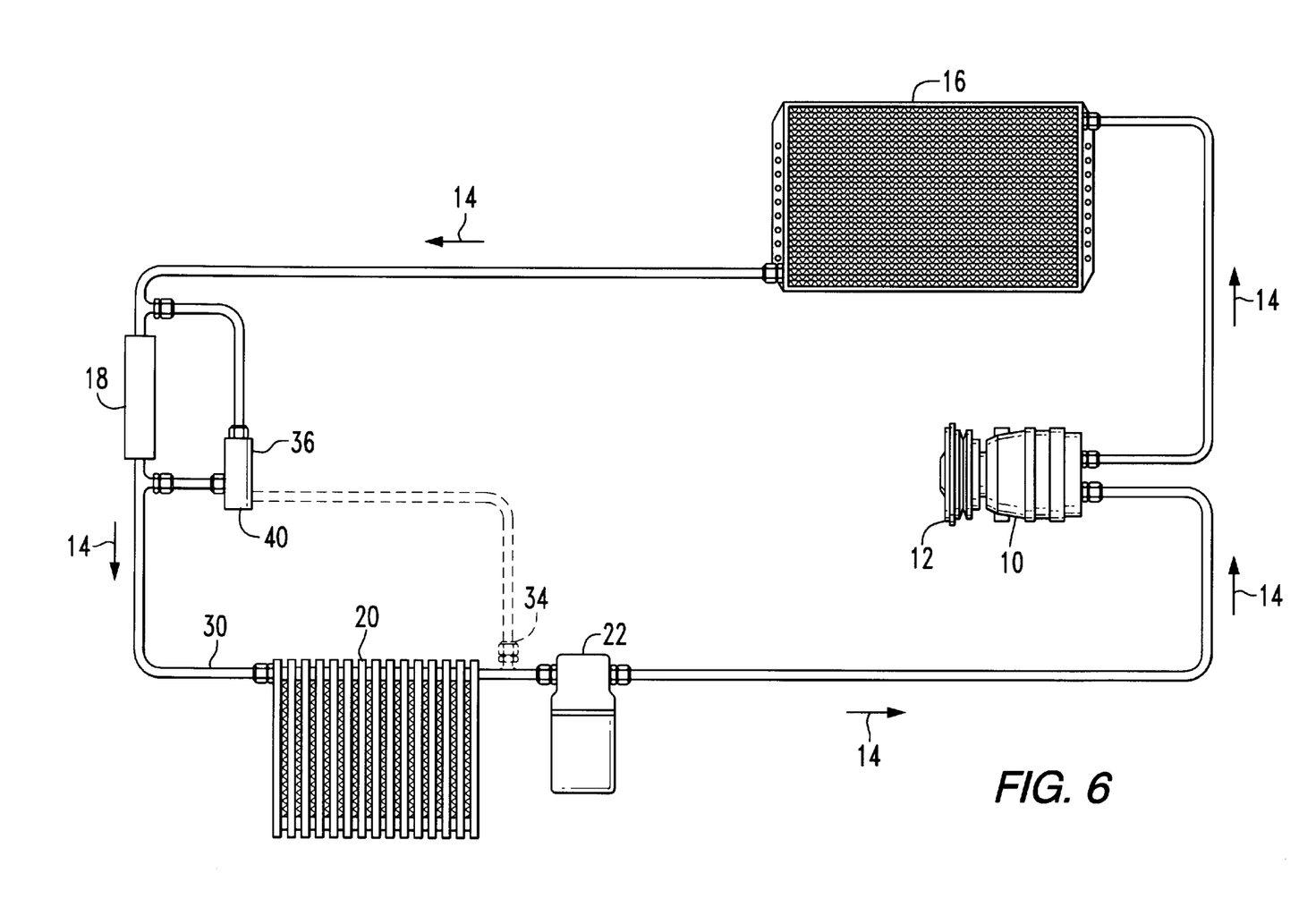
FIG. 6 is a system diagram of a mobile air conditioning system including a fourth embodiment of a refrigerant control system of the invention wherein a pressure sensitive control valve is connected to sense evaporator input or output pressure or both to supplement the amount of refrigerant passed by an orifice to an evaporator.

In FIG. 6 the fourth embodiment of the mobile air conditioning system of the invention includes a pressure sensitive control valve 36 that is connected in parallel with the orifice 18 to supplement the flow of refrigerant through the orifice 18. As in FIG. 3, the valve 36 is connected to be controlled by the refrigerant at the evaporator input 34, but the valve could alternately be connected to monitor the evaporator 20 output pressure 34 (as illustrated by the dashed connection 37) in accordance with FIG. 4. Still further, the embodiment of Figure could be further modified to sense both the evaporator input and output pressure in a manner as illustrated in FIG. 5. In this embodiment the size of the fixed opening in the orifice 18 would be selected on the small size with valve 36 providing the added refrigerant flow to improve system performance.

Figure 7:
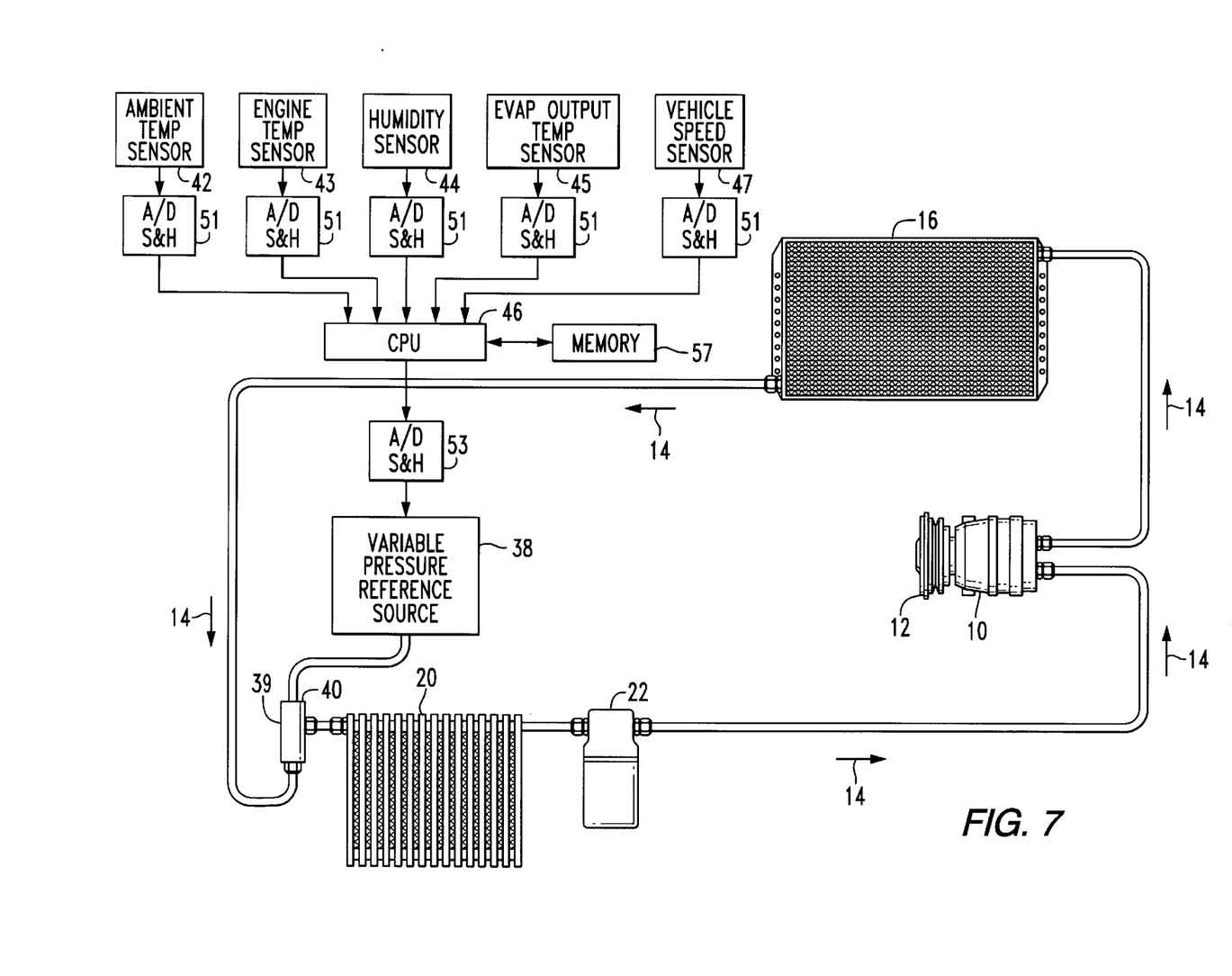
FIG. 7 is a system diagram of a mobile air conditioning system including a fifth embodiment of the invention of a refrigerant control system of the invention wherein a reference pressure source is provided for the pressure sensitive control valve, which reference source is variable and is controllable by a plurality of additional signals corresponding to added sensed variables.

In the fifth embodiment of the invention of FIG. 7, the pressure sensitive control valve 39 is connected to sense the evaporator input pressure. A reference source 38 is connected to a pressure input port 40 of the valve 39 to provide a reference pressure to which the evaporator output pressure can be compared. The reference source 38 can be a fixed type, or a variable type as illustrated. If variable, the output pressure of the source 38 can be controlled by a number of inputs. For example a ambient temperature sensor 42 (already provided with some air conditioning systems), an engine speed sensor 43 (tachometer), a humidity sensor 44, an evaporator 20 output temperature sensor 45 and a vehicle speed sensor 47 (speedometer) can be connected via analog to digital converters and sample and hold circuits 51 to the vehicle computer 46. The computer 46 can periodically scan each sample and hold circuit 51 in sequence and transfer the various read outs into memory 57. The computer 46 can be conventionally programmed to provide a weighing factor to each of the scanned variables, relative to the control valve 39 sensed refrigerant pressure, that can be tailored to function with the characteristics of the mobile air conditioning system to which the control system of the invention is being applied. The computer 46 will periodically analyze all the inputs and provide and output signal to a sample and hold circuit and digital to analog converter 53 that will store the signal between analysis. The output of the sample and hold circuit will be applied to a digital to analog converter circuit to provide a composite electrical control signal to control the output of the reference source 38. The composite control signal functions to supplement the evaporator input pressure as the system control function. For example, if the ambient humidity increases, or the ambient temperature increases, or the evaporator 20 output temperature increases, the contribution of these variable input signals, alone, or in combination, will be in a direction to create an input to the composite control signal in a direction to increase refrigerant flow (and vica versa). In contrast, if the engine speed increases, or the vehicle speed increases, the contribution of these variable input signals, alone, or in combination, will be in a direction to decrease refrigerant flow. The composite output signal from the computer 46 will function via the variable source 38 in a manner to supplement the refrigerant pressure sensing control to provide to a means by which the control system of the invention can better respond to the multitude of variables that impact the mobile air conditioning system performance. Although FIG. 7 illustrates a control system that includes a pressure sensitive valve that senses evaporator input pressure, alternately the valve can sense the evaporator output pressure and the evaporator input pressure can then be sensed electronically.

Figure 8:
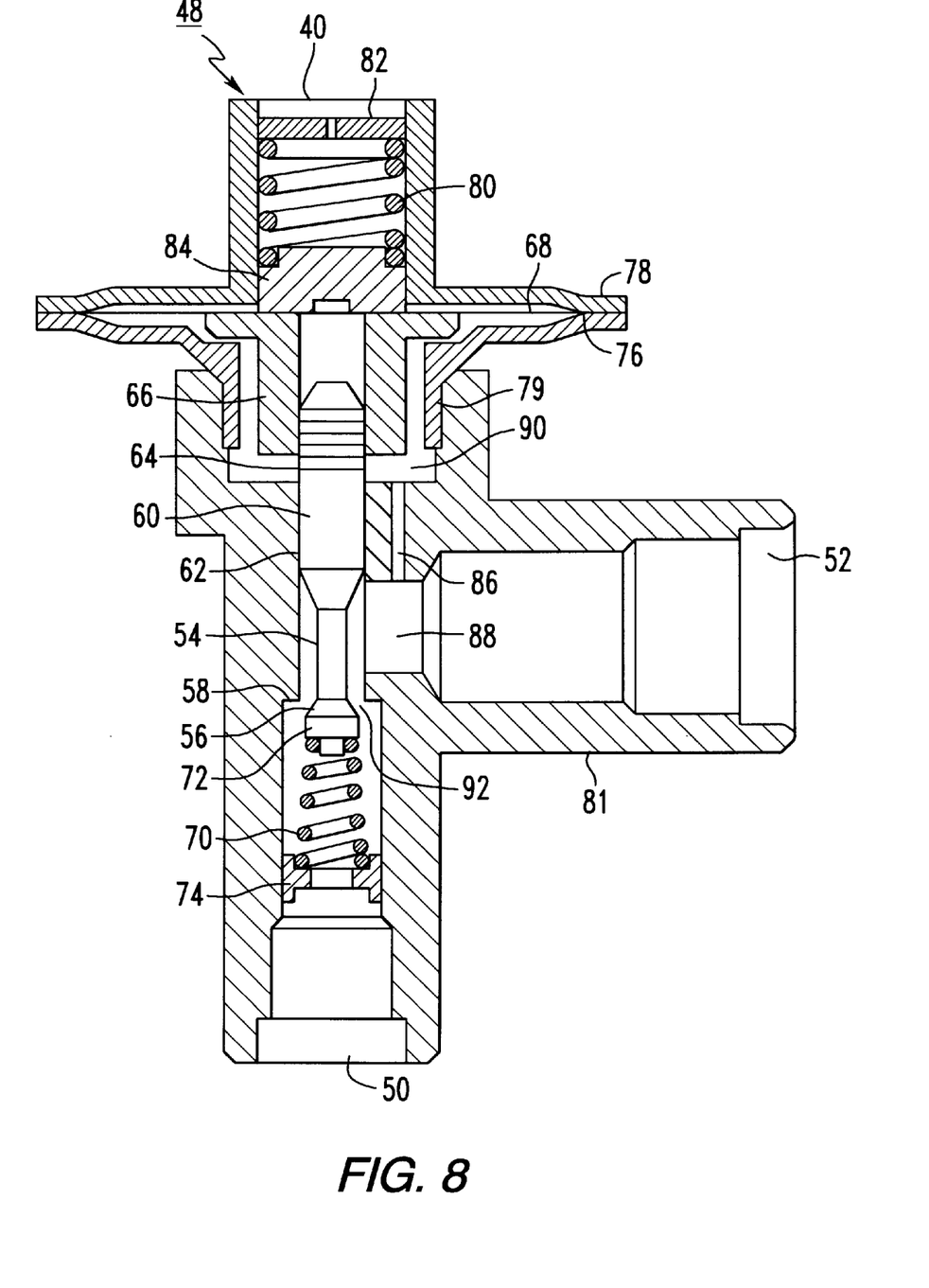
FIG. 8 is a mechanical cut away view of a first embodiment of a pressure sensitive control valve of the invention for use in the control of a mobile air conditioning system.

The embodiment of the pressure controlled valve 48 of the invention illustrated in FIG. 8 includes an inlet 50 adapted to be connected to receive refrigerant flow from the condenser 16 and an outlet 52 adapted to be connected to transmit refrigerant flow to the evaporator 20. The amount of refrigerant flow is controlled by the position of the valve stem 54 edge 56 relative to the valve seat 58. The valve stem 54 is connected to a pin 60, a part of which is located in the pin bearing 62, so that the pin 60 can move along the bearing 62. The pin end 64 is pressed fit into a follower 66 which in turn is connected to a diaphragm 68. A fine tune adjustment spring 70 is located between the opposite end 72 of the pin stem 54 and a fine tune adjusting screw 74, so as to provide a pressure on the end 72 to urge the follower 66 against the diaphragm 68. The diaphragm 68 is connected and is pressure sealed at its ends to the diaphragm chamber 78 which in turn is mounted by a sealed connection 79 to the valve 48 casing 81. An atmospheric or reference pressure compensation spring 80 is connected between vent 82 and a spring follower 84 which urges against the opposite side of the diaphragm 68. The vent 82 may be mounted in place to the vent chamber 83 by a pressure fit, or if an added adjustment is desired, may be mounted with a threaded connection wherein the vent 82 may be rotated to provide an adjustment for setting the pressure being applied by the compensation spring 80.

The evaporator input refrigerant pressure is sensed by the valve 48 by a refrigerant pressure sensing path 86 coupled between the valve stem cavity 88 and the diaphragm cavity 90. The casing 81 and the diaphragm cavity 90, when the valve 48 is connected into the air conditioning system, form a sealed chamber for the sensed refrigerant at the evaporator input. As the pressure increases, the added pressure on the diaphragm causes the diaphragm to flex in a direction to move the stem 56 to reduce the spacing between the stem edge 56 and the valve seat 58 and thereby reduce the size of the opening 92 available for refrigerant flow. When the evaporator input pressure decreases the diaphragm 68 causes the size of the opening 92 to increase. Hence, as can be seen the valve 48 functions so as to control the size of the opening 92 as an inverse function of the evaporator input pressure i.e. as pressure goes up, the size of the opening 92 decreases, and vicsa versa.

Figure 9:
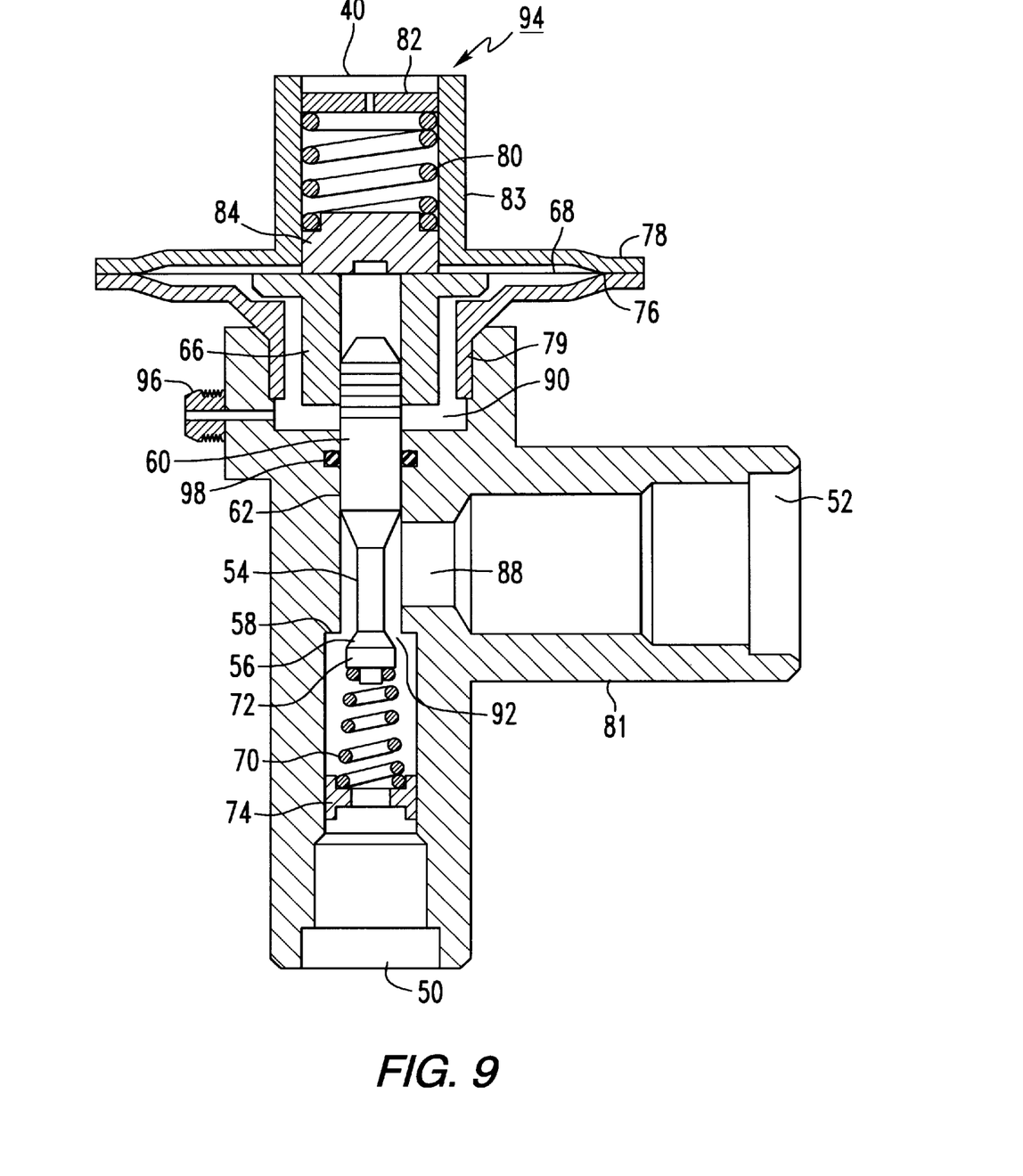
FIG. 9 is a mechanical cut away view of a second embodiment of a pressure sensitive control valve of the invention for use in the control of a mobile air conditioning system.

In the description of the pressure controlled valve 94 of the invention of FIG. 9, for the purpose of simplifying the description, the same elements in FIGS. 8 and 9 will have the same reference numerals. In FIG. 9, the flow path 86 of FIG. 8 is eliminated and an evaporator output pressure sensing path 96 is substituted in its place. The pressure sensing path 96 is adapted to be connected to the evaporator output 34 of FIGS. 4, 5 and 6 by suitable coupling means. In addition, the valve 94 of FIG. 9 will also include an O ring 97 between the pin 60 and bearing 62 so to provide isolation between the evaporator input refrigerant in the valve stem cavity 88 and the diaphragm cavity 90. The valve 94 will control the size of the opening 92 as an inverse function of the pressure in the diaphragm cavity 90 evaporator output pressure in the same manner as described with regard to FIG. 8.

In both the embodiments of the pressure controlled valves of FIGS. 8 and 9, the amount of travel of the pin 54 is selected and adjusted by the spring 70 (and spring 80 if made adjustable) so that as the refrigerant input pressure to the diaphragm chamber 90 can move the pin 54 to cover the desired range of adjustment of the opening 92. The arrangement is such that the opening 92 never closes beyond the point of minimum refrigerant flow needed to maintain the compressor 10 operable so that a breakdown in the valves 48 or 94 does not shut off the refrigerant flow to a level to cause compressor failure.

The valves 48 and 94 of FIGS. 8 and 9 can be modified so as to the vent can be coupled as the port 40 to pressure source 38 of FIGS. 5, 6 and 7 instead. The pressure source 38 can be designed to be less than atmospheric pressure (vacuum) or greater than atmospheric pressure (positive pressure) depending on design preferences. An increase in pressure applied to the vent 82 will reduce the effect of the pressure in the diaphragm cavity 90 and will reduce the valve opening 92, and vicsa versa.

The designs of the valves 48 and 94 of FIGS. 8 and 9 can be combined to sense both the evaporator 20 input and output pressure as illustrated in FIG. 6, by including the input pressure sensing path 86 or the output pressure sensing path 96, and by using the vent 82 as the port 40 to provide a path for sensing the other evaporator input or output pressure.

The evaporators 20 come in a variety of designs, i.e. "S" flow, "U" flow, multipath flow, etc., depending on various design criterions and the pressure drop across the evaporator. The pressure drop may be less than 2 lbs. and greater than 10 lbs. With the lower pressure drop type evaporators it is preferred to use the input pressure sensing valve of FIG. 8 in the embodiment of FIG. 3. If the evaporator 20 is of the type that exhibits higher pressure drop the valve 94 of FIG. 9 may be preferred to be used in the embodiments of FIGS. 4, 5, 6 and 7 (depending upon design criterions).

The control valves 48 and 94 of the invention of FIGS. 8 and 9 primarily sense pressure and changes therein, and when incorporated into a mobile air conditioning system as described herein, have a very rapid response time as compared to the much slower temperature sensing mechanism of the expansion valves of the prior art. Therefor the pressure sensitive valves of the invention provide a more responsive control that can more readily adjust to the continuous changing driving conditions and the input variables as described in detail above. Further, in contrast to the expansion valve of the prior art, the control valves of the invention disclose a design for a valve mechanism that has a sufficient degree of adjustment to provide the desired degrees of refrigerant flow control, while at the same time provides for limited travel so that the valve mechanism will not fail in the closed mode. This assures ample refrigerant flow to the compressor to prevent compressor break down should the valve fail. The cost of the valve of the invention based on the pressure sensing design can be significantly less than the more complex thermal sensing mechanism of the expansion valves of the prior art. Still further, as discussed above, a valve embodying the invention, in its capability in sensing either evaporator input pressure, or output pressure, or both, and with appropriate modifications as also discussed, has application for use with a variety of high, low, or intermediate pressure drop evaporators. Valves embodying the invention in addition also have the capability to be combined with a variable pressure (or vacuum) source. The variable source can provide an added signal input by which other variables can be combined with the sensed pressure to provide added control to enhance the performance of mobile air conditioning systems.

As previously mentioned above, in an orifice accumulator type system, it is the accumulator that controls or regulates the amount of active refrigerant charge in the system, and it is the combination of the orifice and the accumulator that control the refrigerant flow through the system. When excess refrigerant flows to the evaporator, the liquid overspill collects in the accumulator. This excess liquid refrigerant is held in the accumulator, thereby reducing the effective refrigerant charge in the system. On the other hand, when too little refrigerant flows into the evaporator, the accumulator adds more refrigerant into the system through the bleed hole. This addition and extraction of refrigerant to the system increases flow to the evaporator due to the increased amount of refrigerant in the condensing side of the air conditioning system. This addition and extraction of refrigerant to the effective refrigerant system along with the orifice size (valve opening) provides the evaporator refrigerant flow control.

In effect the control valves 28, 32, 35, 36, and 39, of FIGS. 3, 4, 5, 6, and 7, respectively, function as variable orifices in an orifice accumulator type air conditioning system that provide for a controlled flooded evaporator operation as the compressor and condenser capacities change. This is in contrast to the expansion valve receiver type system of FIG. 2. The valves receive the liquid refrigerant from the condenser and like the orifice, flash the liquid into a combination of majority liquid and some vapor during which time there is a temperature and pressure drop in the refrigerant as it flows into the evaporator. As mentioned above, since the valve will not entirely close, the opening in the valve will vary between upper and lower limits. These limits will change for different vehicular air conditioning designs to satisfy the required refrigerant flow rates in the various system design specifications. As an example, an air conditioning system that delivers 24,000 BTU/Hr. at maximum cooling loads may have a valve with an opening that varies to provide an effective variable orifice with operation limits corresponding to 0.075 inches diameter to 0.045 inches diameter.

The valves sense the pressure of the refrigerant adjacent to the evaporator 16, at the input (FIGS. 3 and 7), at the output (FIG. 4), at the input and the output (FIGS. 5 and 6) to control the size of the valve opening (instantaneous orifice size). The pressure drop across an evaporator is a function of the amount of refrigerant flow there through. As mentioned above, the pressure drop across various models of evaporators is known or can be measured. If the input pressure is being measured, since the pressure drop for any evaporator design is known, the input pressure when adjusted for an average known evaporator pressure drop is in effect a good approximation of evaporator output pressure. As mentioned above, the control of the valve provides an infinite number of orifice sizes between the limits of operation is inversely proportional to the evaporator pressure. This means that as the sensed pressure increases, the size of the opening in the valve decreases. Conversely, as the sensed pressure decreases, the opening in the valve increases.

The arrangement is such that as the refrigerant pumping capacity of the compressor changes due to changes in engine speed, or as the heat rejection capacity of the condenser changes due to changes in air flow there through resulting from changes in vehicle speed and engine fan speed, or both, the valve, acting as an variable orifice, responds to the sensed refrigerant pressure to vary the valve opening in a direction to enhance the cooling capacity of the system For example, if the capacity of the condenser and compressor increase, such as by vehicle acceleration to the road run condition, the valve adjusts the size of the opening in a direction to take advantage of the increased capacities to increase the cooling capacity of the system. On the other hand, if such vehicle slows to an idle condition, then the valve adjusts the opening so as conform the system to lower compressor and condenser capacities while preventing excess liquid refrigerant flow to the accumulator. Hence as can be seen, the variable orifice effect of the valve tailors the system operation for enhanced operation for high compressor and condenser capacities during high speed road run, and for lower capacities at idle, and for various capacities in between.

As mentioned above, for ideal evaporator operation, the substantially all liquid refrigerant from the valves should enter the evaporator and the refrigerant at the evaporator output should be all vapor at its saturation temperature (boiling point). However, in an orifice accumulator type of system the output refrigerant should be substantially total vapor, i.e. vapor with a low level of liquid flow as needed by the accumulator to keep the system charged. The operation of the valves are set to function, over the above mentioned changes in compressor and condenser capacities, so as to control the valve opening in a direction for pressures at the output of the evaporator that corresponds to a situation wherein the entire evaporator is filled with at least some liquid refrigerant (corresponding to saturated liquid refrigerant at saturated temperature, i.e. the boiling point of liquid refrigerant) so as to have a refrigerant boiling action through out the evaporator to achieve heat absorption over the entire evaporator, while having saturated refrigerant vapor at substantially total vaporization (vapor refrigerant at boiling point) adjacent the output of the evaporator so as to provide the controlled level of a small amount of liquid refrigerant to the accumulator as may needed to keep the active refrigerant flow properly charged.

Figure 10:
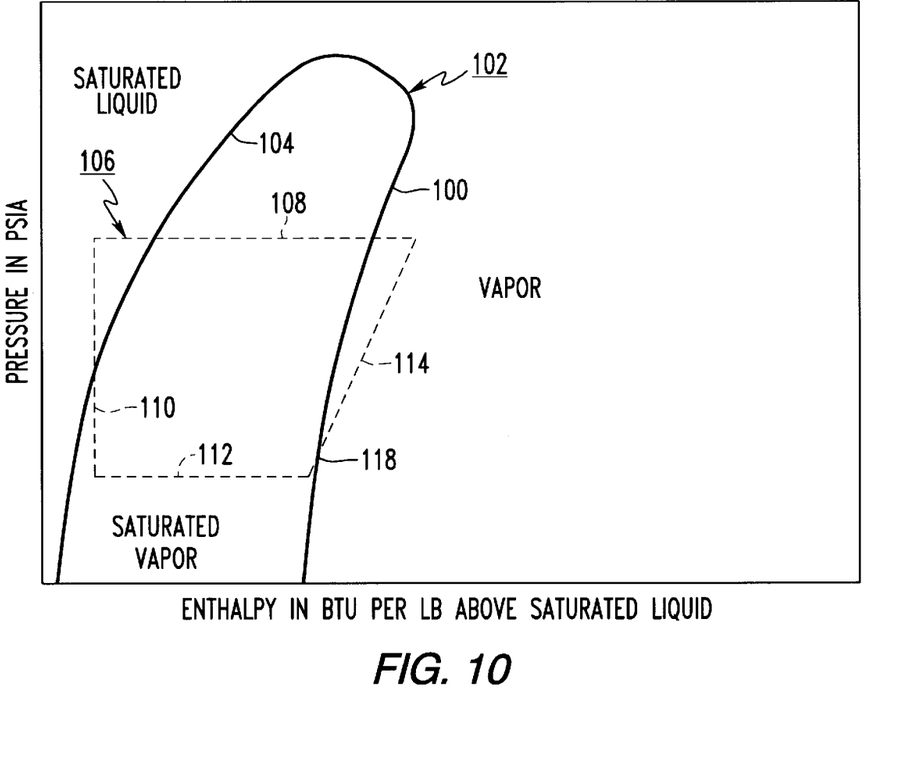
FIG. 10 includes a sketch of a typical pressure-enthalpy chart for an automotive refrigerant with an example of a refrigeration cycle imposed thereon.

The valve interacts with the accumulator control the flow of refrigerant in the system with changes in compressor and condenser capacities in a direction toward evaporator output pressures that follow the refrigerant pressures in the pressure-enthalpy diagram of FIG. 10 along the right hand portion 100 of the bell type shaped curve 102 marking the division between saturated vapor and total vaporization. The refrigerant within the bell shaped curve 102 changes from entirely liquid at the left hand portion 104 to entirely vapor at the right hand portion 100, with decreasing level of liquid and increasing levels of vapor from left hand portion 104 to the right hand portion 100. The refrigerant cycle 106 on the pressure-enthalpy diagram includes an upper horizontal dashed line 108 representing the action of the condenser action of liquefying the refrigerant and extends beyond the bell shaped curve on both sides. The above mentioned refrigerant flashing action of the orifice or valves can be represented by a vertical dashed line 110 extending downward from the end of the horizontal line 108 to points within the bell shaped curve 102 wherein the majority of the refrigerant is liquid. The evaporator action can be represented by the horizontal dashed line 112 extending from the vertical line across the bell shaped curve 102 within the bell shaped curve, or to, or beyond, the right hand portion 100 of the bell shaped curve. The refrigeration cycle 102 is completed by the generally vertical dashed line 114 extending upward from the end of the horizontal evaporator line 112 to the horizontal condenser line 108 representing the action of the compressor.

The relationship of the various dashed lines depends upon the operation of the air conditioning system. If the system is operating along this horizontal line 112 with an evaporator output pressure corresponding to saturated vapor within the bell shaped curve 102, the evaporator will output liquid, the amount of which will depend on the refrigerant pressure. In the case of the larger fixed orifice of the prior art (tailored for road run), during idle the output pressure would fall within the bell shaped curve 102 to a degree to cause the evaporator to output liquid which will fill the accumulator to reduce the active charge in the system and thereby reduce the cooling capacity of the system. In the case of the small fixed orifice of the prior art (tailored for idle), during road run the output pressure would rise within the evaporator to prematurely reach the right hand portion 100 of the bell shaped curve 102 within the evaporator thereby causing total vaporization within the evaporator and the creation of the undesirable hot spots. With the control system of the invention, the flow of refrigerant can be controlled in the system as the various compressor and condenser capacities change in a direction so that the evaporator output pressures (represented by junction 118) closely follow the right hand portion 100 of the curve 102 in a manner to either stay, just inside the right hand portion 100 of the bell shaped curve 102, or move back and forth about and close to the right hand portion 100, as capacities change so as to reduce the likelihood of the creation of hot spots with in the evaporator while also providing the low level of liquid refrigerant flow to the accumulator to keep the system charged.

Figure 11:
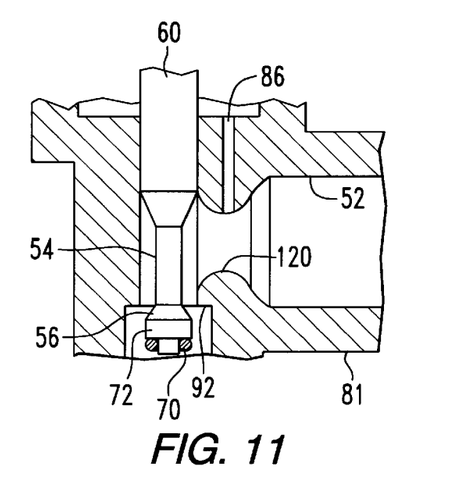
FIG. 11 includes a portion of the mechanical cut away view of the valve of FIG. 8 modified to include venture type tube configuration at the point the pressure is sensed.
Figure 12:
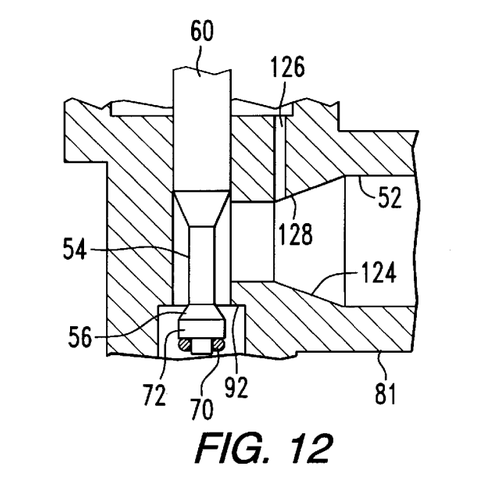
FIG. 12 includes a portion of the mechanical cut away view of the valve of FIG. 8 modified to include stepped orifice type configuration at the point the pressure is sensed.

During periods of high refrigerant flow through the evaporator, the pressure drop across the evaporator may vary by an amount from the average, or design criterion, of the evaporator so that some added compensation may be desired for the valve of FIG. 8 for added control during the high refrigerant flow rates. In such case, instead of measuring the pressure at the valve stem cavity 88, the wall portions of the valve adjacent the sensing path 86 can be modified so to the form the venturi tube 120 of FIG. 11 (a contraction with a subsequent expansion), or a stepped orifice 124 of FIG. 12 (an expansion) and a pressure sensing path 126 connected at the point of expansion 128 of the stepped orifice 124. With the embodiments of pressure sensing of FIGS. 11 and 12, the pressure measurement will have a compensating factor based on the refrigeration flow rate.

In addition, although the valve or variable orifice 32 of FIG. 4 is illustrated as being physically located adjacent the input of the evaporator 20, it should be understood that the valve 32 could just as well be located adjacent the output of the evaporator 20 in a manner in which the temperature sensing valve 24 of FIG. 2 is located, so as to reduce the length of the connection between the evaporator output 34 and the valve 24 an allow the valve 32 to be more responsive.

What is claimed is:

1. In a vehicular air conditioning system including a compressor, a condenser, and an evaporator connected in series for cyclic refrigerant flow therein wherein the vehicle engine drives the compressor so that the compressor capacity is a function of engine speed, and the capacity of the condenser is a function of the vehicle speed and engine fan speed, a control system for controlling refrigerant flow in the air conditioning system comprising:

refrigerant storage control means coupled between the evaporator and the compressor for storing liquid refrigerant received from the evaporator and for releasing stored refrigerant into the air conditioning system to control the amount of active refrigerant the air conditioning system;

a pressure sensitive control valve having an input port, an output port, a variable valve mechanism there between having a variable opening for connecting the input port to the output port, and a pressure sensing mechanism coupled to the variable valve mechanism for providing a displacement movement thereto for controlling the size of the opening of the valve mechanism;

means for coupling the input and output ports of the pressure sensitive valve in the air conditioning system between the condenser and the evaporator, and means for coupling the pressure sensing mechanism to sense the refrigerant pressure adjacent to the evaporator so that the valve functions to control the amount of refrigerant flow through the air conditioning system in a direction so as to enhance the cooling capacity of the air conditioning system relative to changes in at least one of the compressor and condenser capacities.

2. A refrigerant control system of claim 1 wherein the pressure sensitive mechanism senses evaporator input refrigerant pressure.

3. A refrigerant control system of claim 1 wherein the pressure sensitive mechanism senses evaporator output refrigerant pressure.

4. A refrigerant control system of claim 1 wherein the pressure sensitive mechanism senses both the input and output evaporator refrigerant pressure.

5. A refrigerant control system of claim 1 wherein the pressure sensitive mechanism includes a reference port for receiving a reference pressure for comparing the sensed pressure with the reference pressure and for providing the displacement motion as a function of the pressure difference there between.

6. A refrigerant control system of claim 5 wherein the reference pressure is the atmospheric pressure.

7. A refrigerant control system of claim 5 wherein the reference pressure source is adjustable and including means for sensing ambient temperature for adjusting the reference pressure source in a direction so that the differential pressure is in a direction to increase the size of the valve opening.

8. A refrigerant control system of claim 5 wherein the reference pressure source is adjustable and including means for sensing ambient humidity for adjusting the reference pressure source in a direction so that the differential pressure is in a direction to increase the size of the valve opening.

9. A refrigerant control system of claim 5 wherein the reference pressure source is adjustable and including means for sensing vehicle speed for adjusting the reference pressure source in a direction so that the differential pressure is in a direction to decrease the size of the valve opening.

10. A refrigerant control system of claim 5 wherein the reference pressure source is adjustable and including means for sensing engine speed for adjusting the reference pressure source in a direction so that the differential pressure is in a direction to decrease the size of the valve opening.

11. A refrigerant control system of claim 5 wherein the reference pressure source is adjustable and including means for sensing evaporator output temperature for adjusting the reference pressure source in a direction so that the differential pressure is in a direction to increase the size of the valve opening.

12. A refrigerant control system of claim 1 wherein an orifice is connected in parallel to the pressure sensitive valve.

13. A refrigerant control system of claim 1 wherein the refrigerant storage control means is an accumulator.

14. A refrigerant control system of claim 13 wherein the valve controls the size of the valve opening in a direction toward achieving evaporator refrigerant pressure at the output of the evaporator corresponding to saturated refrigerant vapor at substantially total vaporization adjacent the output of the evaporator and substantially total saturated liquid refrigerant at saturation temperature within the evaporator.

15. In a vehicular air conditioning system including a compressor, a condenser, and an evaporator connected in series for cyclic refrigerant flow therein and wherein the vehicle engine drives the compressor so that the refrigerant pumping capacity of the compressor increases and decreases with increases and decreases in vehicle engine speed, and the heat rejection capacity of the condenser increases and decreases with air flow there through with increases and decreases in vehicle speed and engine fan speed, so that the air conditioning system operating capacity changes with vehicle operation between idle and road run, a control system for controlling the flow of refrigerant flow in the air conditioning system comprising:

an accumulator coupled between the evaporator and the compressor;

a pressure sensitive control valve having an input port, an output port, a variable valve mechanism there between having a variable opening for connecting the input port to the output port and a pressure sensing mechanism coupled to the variable valve mechanism for providing a displacement movement thereto for controlling the size of the opening of the valve mechanism;

means for coupling the input and output port of the pressure sensitive valve in the air conditioning system between the condenser and the evaporator, and means for coupling the pressure mechanism to sense the refrigerant pressure adjacent to the evaporator to control the refrigerant flow through the valve mechanism as a function of the magnitude of the sensed pressure in a direction toward enhancing the heat absorbing capacity of the evaporator as the air conditioning system operating capacity changes as vehicle operation changes between idle and road run.

16. A control system of claim 15 wherein the accumulator accumulates liquid from the substantially totally vaporized refrigerant outputted by the evaporator and bleeds off accumulated liquid refrigerant to keep the air conditioning system charged and thereby interacts with the valve in a direction to enhance the heat absorbing capacity of the evaporator.

17. A control system of claim 15 wherein the variable valve is responsive to the displacement action of the pressure sensitive mechanism to control the size of the valve opening in a direction towards evaporator refrigerant pressures corresponding to saturated refrigerant vapor at substantially total vaporization adjacent the output of the evaporator and substantially total saturated liquid refrigerant at saturation temperature within the evaporator.

18. A control system of claim 15 wherein the size of the valve opening increases to increase refrigerant flow as the air conditioning system operating capacity increases for enhancing the evaporator cooling operation by taking advantage of the increased operating capacity, and the size of the valve opening decreases to decrease refrigerant flow with as the air conditioning system operating capacity decreases for enhancing the cooling operation evaporator with decreasing operating capacity.

19. A control system of claim 15 wherein the pressure sensing mechanism measures pressure adjacent the input of the evaporator.

20. In a vehicular air conditioning system including a compressor, a condenser, and an evaporator connected in series for cyclic refrigerant flow therein and wherein the vehicle engine drives the compressor so that the refrigerant pumping capacity of the compressor increases and decreases with increases and decreases in vehicle speed, and the heat rejection capacity of the condenser increases and decreases with air flow there through with increases and decreases in vehicle speed and engine fan speed, a control system comprising:

an accumulator coupled between the evaporator and the compressor for storing liquid refrigerant received from the evaporator and for releasing stored refrigerant into the air conditioning system to control the amount of active refrigerant in the air conditioning system;

a pressure sensitive control valve having an input port, an output port, a valve between the input port and output port, and a pressure sensing mechanism coupled to the valve for providing a displacement movement thereto as a function of sensed pressure for controlling the size of the valve opening;

means for coupling the input and output ports of the pressure sensitive valve in the air conditioning system wherein the valve controls the refrigerant flow from the condenser to the evaporator, and means for coupling the pressure sensing mechanism to sense refrigerant pressure adjacent the evaporator so that the valve functions as a variable orifice to control the amount of refrigerant flow through the system while interacting with the accumulator in a direction toward achieving heat absorption over substantially the entire evaporator with variations in compressor and condenser capacities.

21. A variable orifice control system for vehicular air conditioning systems including a compressor, a condenser, and an evaporator connected in series for cyclic refrigerant flow therein, and wherein the vehicular air conditioning system capacities change when the vehicle engine that drives the compressor changes speed wherein the refrigerant pumping capacity of the compressor increases and decreases with increases and decreases in vehicle engine speed, and wherein the heat rejection capacity of the condenser increases and decreases with air flow there through with increases and decreases in vehicle speed and engine fan speed, the control system comprising:

refrigerant storage means coupled between the evaporator and the compressor for storing liquid refrigerant received from the evaporator and for releasing stored refrigerant into the air conditioning system to control the amount of active refrigerant in the air conditioning system;

a pressure sensitive control valve having an input port, an output port, a valve between the input port and output port, and a pressure sensing mechanism coupled to the valve for providing a displacement movement thereto as a function of sensed pressure for controlling the size of the valve opening;

means for coupling the input and output ports of the pressure sensitive valve in the air conditioning system between the condenser and the evaporator, and means for coupling the pressure sensing mechanism to sense refrigerant pressure adjacent the evaporator so that the valve functions as a variable orifice to vary the amount of refrigerant flowing in the air conditioning system in a direction for enhancing the evaporator cooling capacity as air conditioning system operating capacities change.

22. A variable orifice control system as defined in claim 21 wherein the valve refrigerant storage means interact to control the cooling capacity of the evaporator in a direction to follow changes in the air conditioning system operating capacity, to increase refrigerant flow as the air conditioning system capacity increases in a direction so as to enhance the cooling operation of the evaporator by taking advantage of the increased air conditioning system capacity, and to decrease refrigerant flow with decreases in air conditioning system capacity in a direction so as to enhance the cooling operation evaporator with decreasing air conditioning system capacity.

23. A variable orifice control system as defined in claim 21 wherein the the control valve interacts with the refrigerant storage means to vary the amount of refrigerant flow in the air conditioning system.

* * * * *